June 23, 1953  O. KARL-GUSTAV A. HÄGERSTRÖM  2,643,054
ARRANGEMENT IN BOOKKEEPING MACHINES
Filed July 23, 1947  3 Sheets-Sheet 1
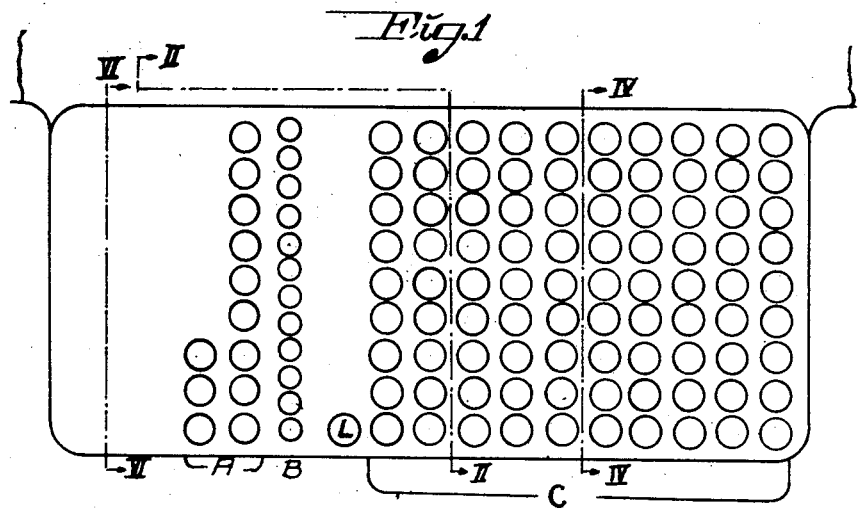
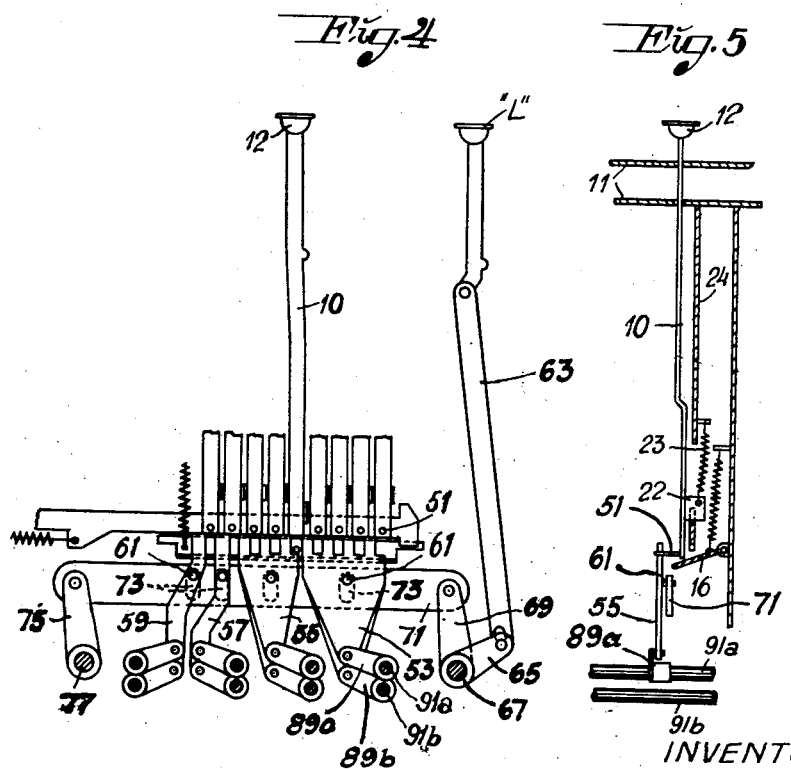
INVENTOR
Olof Karl-Gustav Axel Hägerström
By Darby + Darby
ATTORNEYS June 23, 1953   O. KARL-GUSTAV A. HÄGERSTRÖM   2,643,054
ARRANGEMENT IN BOOKKEEPING MACHINES
Filed July 23, 1947                                       3 Sheets-Sheet 2
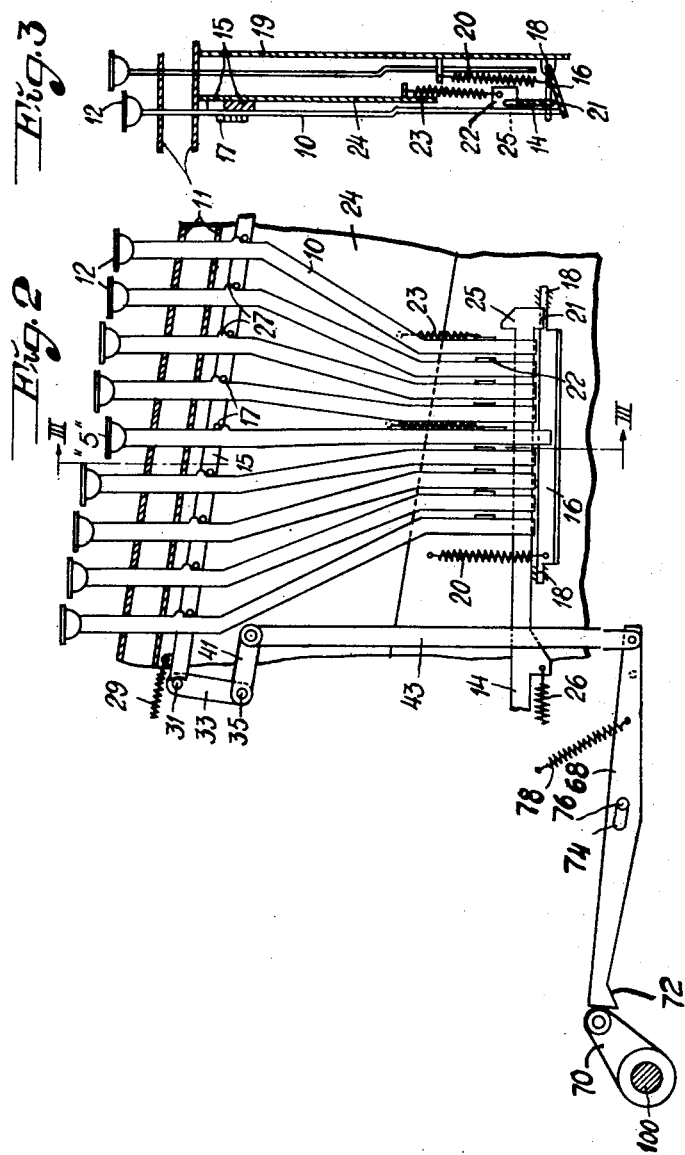
INVENTOR
Olof Karl-Gustav Axel Hägerström
By Darby & Darby
ATTORNEYS

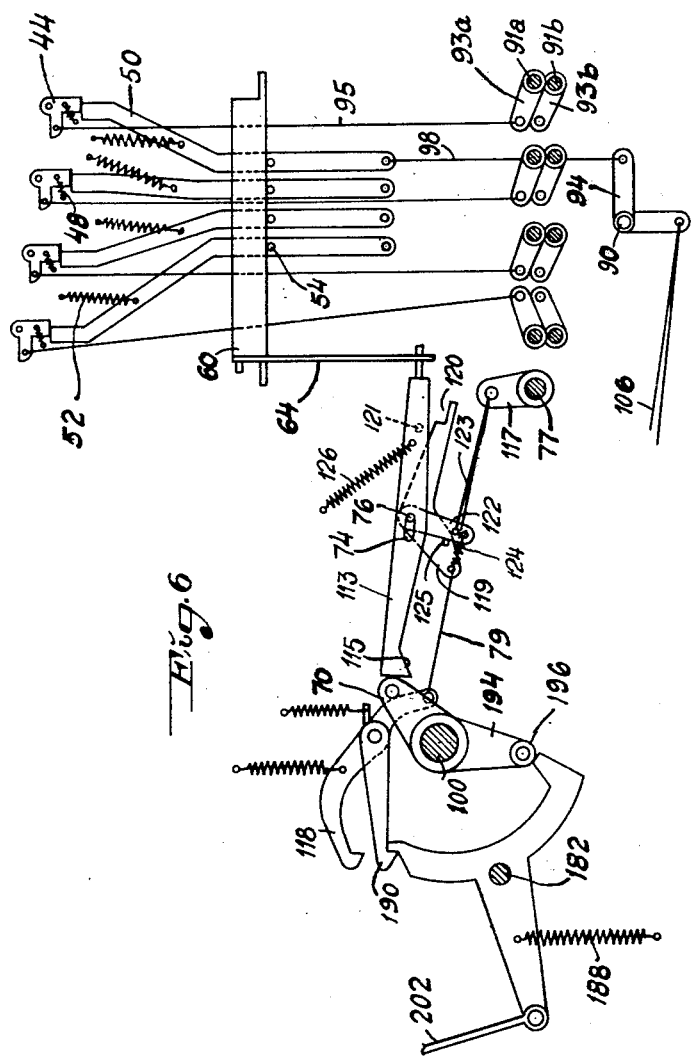

Patented June 23, 1953

2,643,054

UNITED STATES PATENT OFFICE 2,643,054

ARRANGEMENT IN BOOKKEEPING MACHINES

Olof Karl-Gustav Axel Hägerström, Stockholm, Sweden

Application July 23, 1947, Serial No. 762,836
In Sweden January 26, 1940

Section 1, Public Law 690, August 8, 1946
Patent expires January 26, 1960

4 Claims. (Cl. 235—60)

The present invention relates to bookkeeping machines of the kind having a plurality of totalizers which may be selected individually or in groups, manually operable means for selecting the totalizers and for setting amounts to be introduced into the selected totalizers, and printing means for printing the figures set on the manually operable means. In the Nyberg U. S. Patent No. 2,277,250 a machine of this type is described in which machine the totalizers are selected by depressing one of a number of analyzing keys each of which corresponds to a predetermined combination of totalizers necessary for effecting, registering and recording of one of a predeteremined number of possible transactions. In normal operation of a machine of this kind a lettering key and amount keys corresponding to the account numbers are depressed, the machine performs a working stroke for printing purposes only; then the analyzing key for determining the totalizer selection is depressed; then the amount key corresponding to the amount to be entered into the totalizer selected is depressed and the machine performs a second working stroke during which the amount is entered into the selected totalizers and designations corresponding to the operated analyzing, amount and date keys are printed.

Thus with the machine of the Nyberg patent abovementioned two machine operating cycles are normally effected, one for printing only such designations as account numbers set on the amount keys and the second for selecting the totalizers by means of the analyzing keys for setting and entering in the totalizers the amount set on the amount keys and for printing special indications such for example as a date set on a special date key.

The object of the present invention is to provide a book-keeping machine in which the selection of totalizers may be performed by means of the amount keys necessary for setting up the amounts to be introduced into the totalizers, so that special analyzing keys or the like may be dispensed with.

Another object of the invention is to provide a book-keeping machine in which the totalizer selection is combined with the printing of account numbers in such a way that the correct totalizer selection is made automatically.

Still another object of the invention is to provide a book-keeping machine which combines a large number of possible combinations of totalizers, with simplicity in construction and reliability.

The invention is based upon the accounting principles described in the introductory part of and with reference to Fig. 1 in the U. S. specification No. 2,277,250, and is a further development thereof. The theoretical background of and the possibilities offered by the new improvement will first be briefly explained.

If it is assumed as an example and for the sake of simplicity that the book-keeping transactions as to the debit side are to be distributed among four totalizers D1, D2, D3 and D4, and as to the credit side among four totalizers K1, K2, K3 and K4, the selection of totalizers can, of course, be made by having the account numbers contain a figure 1–4, and the corresponding key then selects the required totalizers. The account numbers may preferably be formed such that the first digit thereof serves the purpose of the invention, but, of course, another digit, e. g. the last digit of the account number, may be taken as the "key digit." For instance, if the machine has a ten digits key-board and the account numbers are given five digits, the key row for the first digit of a ten digits number i. e. the first key row from the left, may serve to select the totalizers and indicate the account number for the debit side, and the key row for the first digit of a five digits number, i. e. the sixth key row, serves the same purpose for the credit side. All account numbers which affect the totalizer D1 in debiting, are therefore given 1 as the first digit; thus, for instance the account number 203 is completed into 10203. In the same manner all account numbers which effect the totalizer D2 in debiting, are given 2 as the first digit, e. g. the account number 35 is completed to 20035. Account numbers which in debiting affect the totalizer D1 and therefore have 1 as the first digit, are supposed to affect the totalizer K1 in crediting, said totalizer being selected when the account number is set up on the right side of the key-board, i. e. beginning at the sixth key row. Other digits of the account number may correspond to totalizer selections made from other points of view, so that for instance the second digit from the left designates a sub-group, the corresponding key of which (in the second or seventh key row) selects a particular totalizer for the registration of transacting affecting this sub-group.

If the figure 1 as the first digit of the account number designates the goods account and as second digit designates goods of a special kind, it is therefore possible by setting up the account number 11000 on the key-board starting in the first key row, to select a totalizer for the registration of the total debiting on the goods account and a totalizer for the registration of debiting on the account for said special kind of goods. If instead this account number is set up on the key-board starting in the sixth key row, one may select a totalizer for the total crediting on the goods account and a totalizer for crediting on the account for the special kind of goods designated 01000.

Of course, several keys may select one and the same totalizer. If, for instance, all accounts having 1, 2, 3 or 4 as the first digit of the account numbers are to affect a common totalizer, the keys 1–4 in the first and the sixth key rows may be arranged to select this common totalizer.

One and the same key may also be arranged to select several totalizers. If accounts, the numbers of which have 1 as their first digit, are to affect the totalizers D1 and D2, whereas accounts the first digit of which is 2, are to affect the totalizers D1 and D3, the key 1 of the first key row may be arranged to select the totalizers D1 and D2, whereas the key 2 selects the totalizers D1 and D3.

The keys corresponding to the first, the second, or the last etc. digit of an account number and the depression of which cause the selection of totalizers, may also be used for determining the sense of calculation of the selected totalizers, in case totalizers for subtraction as well as for addition are used. Thus, a key in the left half of the key-board (in the above example of a ten digits key-board that means the five first key rows counted from the highest denomination— from the left—), for instance a key having the numerical value 1 may select the plus side of a balancing totalizer, whereas one of the corresponding keys having the numeral value 1 and located in the right half of the key board (i. e. starting in the sixth key row) may select the minus side of the same totalizer. Of course, one and the same key may select several balancing totalizers and their plus and minus sides in the manner stated in the U. S. patent specification No. 2,227,250.

A preferred embodiment of the invention as applied to a machine of the type described in the above-mentioned Nyberg patent will now be described in greater detail, the basic principles of operation and the general arrangement of the key-board and the totalizers and the forming of the account numbers being mentioned first.

As already stated, the same set of keys is used for the printing of account numbers as well as for introducing amounts into the totalizers, and the account number registration and the amount registration are effected in two different operations. In the first operation the designating account numbers of the two accounts to be debited and credited are set up on the key-board and printed during a following working stroke of the machine. Simultaneously the totalizers that are to receive the corresponding amount registration are selected and, if required, their sense of calculation determined. In a second operation the amount of the book-keeping transaction is set up on the key-board, and during the following second working stroke of the machine this amount is introduced into the selected totalizers.

If it is assumed that the machine is provided with five balancing totalizers designated T, S, V, F and R and two adding totalizers designated $O^1$, $O^2$, these totalizers can be controlled by the keys in the first and sixth key rows as indicated below and in the sense indicated by the appended sign.

| Left key board half<br>Debit<br>In the first key row | Right key board half<br>Credit<br>In the sixth key row |
|---|---|
| Key No. 9: V−  R−  $O^1$+<br>Key No. 8: F+  R−  $O^1$+<br>Keys Nos. 5–7: S−  $O^1$+<br>Keys Nos. 1–4: T+  $O^1$+ | Key No. 9: V+  R+  $O^2$+<br>Key No. 8: F−  R+  $O^2$+<br>Keys Nos. 5–7: S+  $O^2$+<br>Keys Nos. 1–4: T−  $O^2$+ |

The account numbers are supposed to be so formed that the first digit of the designating number of assets accounts is 1, 2, 3 or 4 (different kinds of assets), the first digit of the designating number of liabilities accounts is 5, 6 or 7 (different kinds of liabilities), the first digit of the number of the loss accounts is 8 and the first digit of the number of the profit accounts is 9. Therefore, the number of an assets account reads e. g. 10101, 21234, 31301 or 41040, of a liabilities account reads 50365, 61234 or 71103, of a loss account reads 83309 and of a profit account reads 93309.

If one of said assets accounts is to be debited simultaneously with crediting of any of said liabilities accounts, the operator will set up on the key-board e. g. the following numbers:

10101    50365

As the corresponding keys in the first and in the sixth key row simultaneously are totalizer selecting keys, by the depression of these figure keys the operator will select in the left key board half: the plus side of totalizer T and the plus side of totalizer $O^1$ (T+, $O^1$+), in the right key board half: the plus side of totalizer S and the plus side of totalizer $O^2$ (S+, $O^2$+).

During this first operation the designating account numbers 10101 and 50365 are printed on the printing surface, but no totalizers are as yet thrown into engagement.

After this first working stroke of the machine the transaction amount concerned is set up, and during the subsequent working stroke of the machine the totalizers T, S, $O^1$ and $O^2$ selected during the previous operation are engaged in the additive sense.

The constructional details of the above embodiment of the invention will now be described with reference to the accompanying drawings. Fig. 1 is a plan view of the key-board, Figs. 2 and 3 are a longitudinal and transverse cross section, respectively, of a key row and the corresponding key restoring device. Figs. 4 and 5 are a longitudinal and transversal sectional view, respectively, of a key row in which the keys are also used for totalizer selection. Fig. 6 shows the totalizer releasing bars and their restoring device. Those parts which do not differ from the corresponding parts in the machine described and shown in the United States Patent No. 2,277,250 above-mentioned are not described in full detail or shown on the accompanying drawings and for such common structure reference is made to said patent.

The embodiment herein described, being an improvement of the embodiment described in the U. S. patent specification No. 2,277,250 with reference to Figs. 2–14, is identical or similar thereto as to all details regarding which it does not appear from this description that a difference exists. The five balancing totalizers RA′, RB', RC', RB" and RA" in the patent specification correspond to the totalizers designated T, S, R, V and F, respectively, in the above schedule, but instead of a single adding totalizer TR in said specification, two adding totalizers $O^1$ and $O^2$ are used here. Corresponding or similar details in said patent specification and in the following description have been given the same reference numbers.

The key-board shown in Fig. 1 contains day keys A, month keys B, a key marked "L," forming the so called designating or indexing key, and ten rows each having nine amount keys C. Of the last-mentioned keys only the keys in the first and sixth row counted from the left are arranged also to serve as totalizer selecting keys. The broken lines II—II, IV—IV and VI—VI indicate the approximate position of the cross-sections shown in Figs. 2, 4 and 6.

Each amount key C consists of a key shank 10 guided in the key-board frame 11 and provided with a head 12 (Figs. 2 and 3). All keys in the same row cooperate with a common releasing device for an actuator bar 14, which consists of a plate 16 having both ends pivoted at 18 on a key-board partition 19. A spring 20 strives to keep the plate 16 in such a position that its front end is situated opposite a downward projection 21 on the actuator bar 14. Each key shank 10 is provided with a projection 22, and a spring 23 connects said projection with another key-board partition 24. At its front end the actuator bar 14 is provided with an upwardly directed lug 25. In Figs. 2 and 3 the key "5" is shown depressed, the projection 22 on its key shank 10 later on forming an abutment for the lug 25 of the actuator bar 14.

The machine also comprises printing means connected to the entering means or actuators operated by the amount keys, the printing means and connections being fully described and shown in the Nyberg patent above referred to and therefore not described herein.

During the setting of the machine a depressed key in each row is held in its depressed position by means of a locking bar 15 extending along the key row and provided with a pin 17 for each key shank 10, said pins cooperating with projections 27 on the key shanks. The spring 29 strives to move the bar 15 backwardly, i. e. to the left in Fig. 2. The depressed key is restored to its initial position by means of a restoring rod 31 extending transversely of the key rows and bearing against the back end of the locking bars 15. The rod 31 is carried by arms 33 attached to an axis 35 extending transversely through the key-board. Attached to this axis 35 is another arm 41 pivotally connected by means of a link 43 to one end of a lever 68, the other end of which normally bears against an arm 70 attached to the main shaft 100 of the machine, and which lever end is provided with an inclined surface 72. By means of a longitudinal slot 74 the lever 68 is slidingly and pivotally fulcrumed on a pin 76 attached to the machine frame. A spring 78 strives to rock the lever counter-clockwise and to draw the same backwardly (to the left in Fig. 2).

When the main shaft 100 turns clockwise (Fig. 2) during the first half of the working stroke of the machine, the lever 68 is pushed out of the path of the arm 70, sliding on the pin 76. When the arm 70 has come below the end of the lever 68, the latter goes back under the influence of the spring 78. During the second part of the working stroke, when the shaft 100 turns counter-clockwise, on account of the engagement with the inclined surface 72 the arm 70 will rock the lever 68 clockwise, thereby pulling down the link 43 and releasing the key shanks 10.

The keys of the first and the sixth key rows are chosen also to serve as totalizer selecting keys. To this end the key shanks 10 of said keys are provided at their lower ends with pins 51 (Figs. 4 and 5) which, when the keys are depressed for account designating purposes, cooperate with slides 53, 55, 57 and 59 serving as selector means. (These means are practically identical in the first and the sixth key rows, and, therefore, where it has been found necessary to distinguish the parts connected to the first row of amount keys from the parts connected to the sixth row of amount keys, the reference numerals of the first mentioned parts have been provided with the subscript A and the numerals of the latter part with the subscript B. In describing common functional and structural features, the reference numbers are used without subscript). Of these slides the one marked 53 is provided with four teeth corresponding to the keys "1–4," the one marked 55 is provided with three teeth corresponding to the keys "5–7" and the ones marked 57 and 59 are each provided with one tooth corresponding to the keys "8" and "9," respectively. When amounts are introduced into the machine, the pins 51 enter into the spaces between the teeth when depressing the keys 10, the slides therefore remaining unactuated.

By means of a link 63 the key shank of the designating key "L" is pivotally connected to an arm 65 keyed on an axis 67. Attached to this axis 67 are also arms 69, one for the first and one for the sixth key row. The arms 69 are pivotally connected to the front ends of bars 71 the far ends of which in their turn being pivoted to arms 75 keyed on an axis 77. Cut out in the bars 71 are vertical slits 73 engaged by pins 61 on the slides.

When depressing the key "L" the bar 71 is displaced forwardly, i. e. to the right in Fig. 4, tilting the slides forwardly and bringing the teeth of the slides opposite the pins 51 on the key shanks. Therefore, the latter depression of a key in the first or the sixth row will cause a downward movement of the slide associated with the key in question.

At their lower ends the slides are pivotally connected to arms 89a and 89b keyed on axes 91a and 91b, respectively. These axes extend from the first and the sixth key rows to the left part of the key-board. At their left end they carry arms 93a and 93b, respectively, (Fig. 6) connected by links 95 to the approximately horizontal arms of angular catches 44, the other downwardly directed arms of which bear against the upper ends of totalizer releasing bars 50. These are arranged and connected with the totalizer selecting means in the manner clearly shown and described in connection with Figs. 3, 9 and 10 of the Nyberg patent above mentioned, but differ therefrom in that they are actuated by the links 95 instead of by keys 40, 42. Springs 48 strive to keep the catches 44 in the position shown in Fig. 6 and springs 52 strive to pull the releasing bars 50 upwardly.

When the key "L" is depressed, depression of a key 10 or 12 in the first or the sixth row of amount keys as shown in Fig. 4 will displace downwardly the slide 55 associated with that key and by means of arm 89, axis 91, arm 93 and wire link 95 (Fig. 6) its movement will be transmitted to the catch 44 for the releasing bar 50, turning the same to such an extent that the releasing bar 50 is drawn upwardly by the action of its spring 52. By means of a wire 98 each releasing bar 50 is connected with one arm of a bell-crank lever 94 pivoted on an axis 90, and therefore upward movement of the releasing bar will turn lever 94. The other end of the bell-crank lever 94 is connected by means of wires 106 to mechanisms shown in detail in the U. S. patent specification No. 2,277,250 and serving to prepare the selected totalizer or combination of totalizers for engagement with the actuator wheels. The interconnection of the totalizers and the releasing bars appears from the above schedule and Figs. 4 and 6.

The eight releasing bars 50, not being directly dependent on keys for their actuation, need not be arranged in one row as in the Nyberg patent but are in the present embodiment arranged in two rows, four in each row. For each row there is arranged a restoring plate 60 pivoted at its end in such a manner, that is can turn approximately about one of its longitudinal edges. When turned, the free longitudinal edge of the plate 60 engages pins 54 on the releasing bars 50, restoring them to their initial position in which they are locked again by the angular catches 44.

By means of a link 64 the restoring plate 60 is pivotally connected to one end of a two-armed lever 113. Similar to the key restoring lever 68 the first-mentioned lever 113 is slidingly and pivotally fulcrumed on the pin 76 engaging a longitudinal slot 74 in the lever. The other end of the lever 113 cooperates with the arm 70 keyed to the main shaft 100 of the machine. Similar to the lever 68 the lever 113 has also an inclined surface 115.

The totalizers should not be thrown-in during the account designating operation, and the releasing bars 50 should not be restored at the end of the stroke. To this end there is arranged on the axis 77 actuated by the key "L," an arm 117 (Fig. 6) connected by means of a wire 79 to an additional locking means 118 for the Y-shaped member 184 which operates to throw in the selected totalizers, as explained in the U. S. patent specification No. 2,277,250. The Y-shaped member 184 is pivoted on an axis 182 and is influenced by a spring 188 striving to rock the member counter-clockwise. However, the member 184 is locked by a catch 190 which at the end of the first part of the working stroke is removed by a roller 196 arranged on an arm 194 keyed to the shaft 100, whereby the Y-shaped member rocks counter-clockwise under the action of its spring 188 and the totalizers are thrown into engagement, provided that the additional catch 118 is not active. As a result the totalizers will not be engaged as long as the lettering key is depressed.

In order that the releasing bar 50 should not be restored at the end of the account designating stroke, the lever 113 is provided with a locking means operated by the lettering key, which locks the lever 113 in the position obtained when moved out of the path of the lever 70 thereby at the beginning of the working stroke of the machine.

Said locking device consists of a bell-crank lever 119 journalled on the pin 76 and located close to the lever 113. One arm of the bell crank lever has a recess 120 adapted to engage a pin 121 on the lever 113. Also journalled on the pin 76 is an arm 122 which by means of a link 123 is connected to the above-mentioned arm 117, and which arm 122 also is actuated when depressing the key "L." By means of a spring 124 the arm 122 is connected to the bell-crank lever 119, and said spring strives to maintain a pin 125 on the bell-crank lever 119 in engagement with one edge of the arm 122. Depression of the key 12 swings the arm 122 in such a manner that the spring 124 is tensioned, whereby the bell-crank lever 119 is also moved until its arm provided with the recess 120 abuts against the pin 121 on the lever 113. When at the beginning of the working stroke the lever 113 is displaced by the arm 70, the pin 121 slides on the upper edge of the bell-crank lever 119 and finally reaches the recess 120, the bell-crank lever then snaps behind the pin 121 under the action of its spring 124. Thereafter the lever 113 cannot again be brought into the path of the arm 70 until, after the return of the key 12, the arm 122 is pushed back to its normal position by the link 123 and the bell-crank lever 119 pushed back by the pin 125, whereby the recess 120 is disengaged from the pin 121 and the spring 126 draws the lever 113 towards the arm 70.

The embodiment described above is merely an example of the invention, which does not restrict the scope of the protection given by the following claims.

What I claim is:

1. In a bookkeeping machine having a plurality of totalizers selectable individually or in groups and manually operated means adapted both for introduction of amounts into the totalizers and for selection of the totalizers, in combination, totalizer selection means, amount entering means, means connecting the manually operable means to said amount entering means, setting means for connecting the manually operable means to said totalizer selecting means, means for engaging selected totalizers with said amount entering means, and means operable by said setting means for preventing the operation of said engaging means during the machine cycle in which said setting means are operated and said totalizer selection effected.

2. In a bookkeeping machine having a plurality of totalizers selectable individually or in groups and manually operated means adapted both for introduction of amounts in the totalizers and for selection of the totalizers, in combination, totalizer selecting means, amount entering means, means connecting the manually operated means to said amount entering means, setting means for connecting the manually operable means to said totalizer selecting means, means for engaging selected totalizers with said amount entering means, means for maintaining the totalizer selecting means during the machine cycle following selection in the position set on the manually operable means in the preceding selecting operation, means for operating said engaging means in the machine cycle following selection and means operable by said setting means for preventing operation of said engaging means during the machine cycle in which said setting means is operated and said totalizer selection effected.

3. In a bookkeeping machine having a plurality of totalizers selectable individually or in groups and manually operable means adapted both for introduction of amounts in the totalizers and for selection of the totalizers, in combination, totalizer selecting means, amount entering means, means connecting the manually operable means to said amount entering means, setting means for connecting the manually operable means to said totalizer selecting means, means for engaging selected totalizers with said amount entering means, means for maintaining the totalizer selecting means during the machine cycle following selection in the position set on the manually operable means in the preceding selecting operation, means for operating said engaging means in the machine cycle following selection, means operable by said setting means for preventing operation of said engaging means during the machine cycle in which said setting means is operated and said totalizer selection effected, and means for releasing the totalizer engaging means at the end of the machine cycle during which amount entering occurs.

4. In a bookkeeping machine having a plurality of totalizers selectable individually or in groups and key means adapted both for introduction of amounts into the totalizers and for selection of the totalizer, in combination, actuators for entering amounts into the totalizers, said actuators being under the control of the keys, totalizer selecting slides, said slides being movable to two positions in one of which they are operable by the keys, setting means for setting said totalizer selecting slides in a position to be operated by said keys, means released by operation of said totalizer selecting slides for effecting engagement of selected totalizers with the actuators during a machine cycle following that in which said means is released, and means operated by said setting means for preventing the engagement of selected totalizers with said actuators during the machine cycle in which said setting means are operated and said totalizer selection is effected.

OLOF KARL-GUSTAV
AXEL HÄGERSTRÖM.

References Cited in the file of this patent

UNITED STATES PATENTS

| Number | Name | Date |
|---|---|---|
| 1,323,303 | Martin | Dec. 2, 1919 |
| 2,167,827 | Clary | Aug. 1, 1939 |
| 2,216,063 | Brand et al. | Sept. 24, 1940 |
| 2,277,250 | Nyberg | Mar. 24, 1942 |